United States Patent [19]

Lesch

[11] Patent Number: 5,296,208
[45] Date of Patent: Mar. 22, 1994

[54] MOLECULAR SIEVE SYNTHESIS

[75] Inventor: David A. Lesch, Ossining, N.Y.

[73] Assignee: UOP, Des Plaines, Ill.

[21] Appl. No.: 925,824

[22] Filed: Aug. 7, 1992

[51] Int. Cl.$^5$ ............................................. C01B 33/34
[52] U.S. Cl. ................................... 423/700; 423/701; 423/702; 423/704; 423/705; 423/716; 423/711
[58] Field of Search ............... 423/700, 701, 702, 704, 423/705, 716, 711

[56] References Cited

U.S. PATENT DOCUMENTS

| | | | |
|---|---|---|---|
| 3,228,969 | 1/1966 | Kerr | 423/705 |
| 4,041,135 | 8/1977 | Williams et al. | 423/711 |
| 4,310,440 | 0/1980 | Wilson et al. | 252/435 |
| 4,368,174 | 1/1983 | Valyocsik | 423/700 |
| 4,545,969 | 10/1985 | Diekötter et al. | 423/700 |
| 5,143,879 | 9/1992 | Whitehurst | 423/702 |

OTHER PUBLICATIONS

Lok et al. "Zeolites, 1983, vol. 3, Oct." pp. 282–291.

Primary Examiner—Asok Pal
Attorney, Agent, or Firm—Thomas K. McBride; Richard G. Miller

[57] ABSTRACT

In the hydrothermal synthesis of crystalline microporous molecular sieves from a reaction system containing an organic templating agent, it is found that removal of at least some of the organic reagent prior to the time the formation of crystalline product is complete results in an increased yield of the product. The removal of the organic reagent disrupts the equilibrium that is normally established in the reaction system at the selected crystallization temperature between product formation and product dissolution and shifts the reaction toward the formation of additional product before a new equilibrium can form.

7 Claims, 1 Drawing Sheet

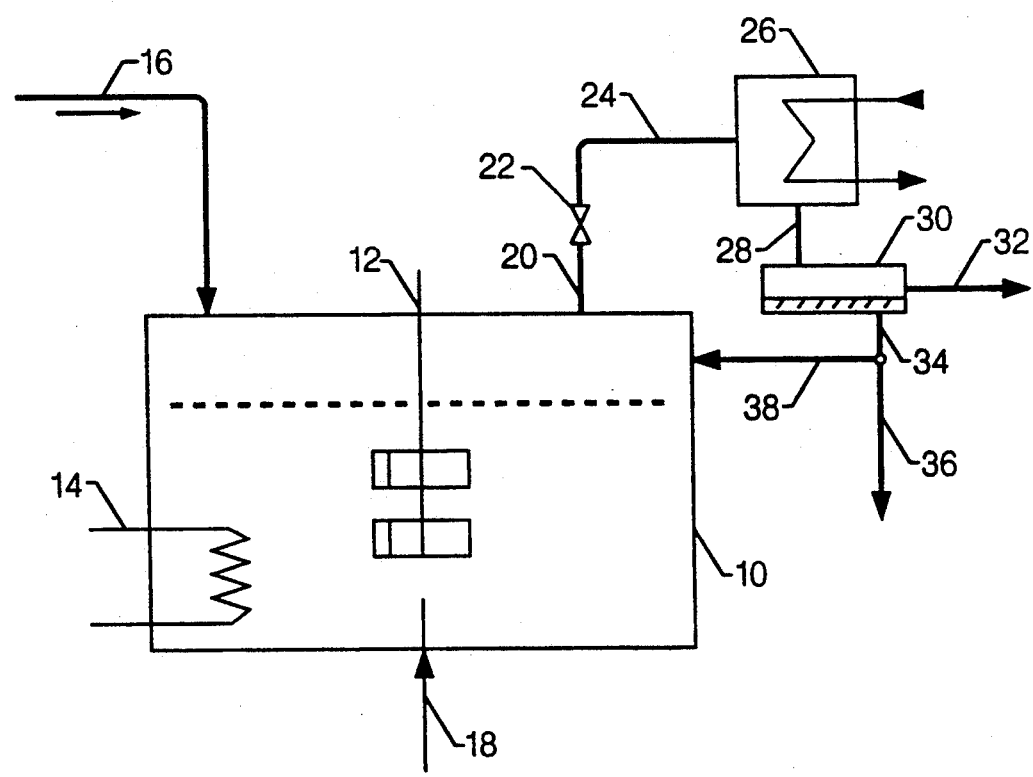

5,296,208

MOLECULAR SIEVE SYNTHESIS

FIELD OF THE INVENTION

The present invention relates in general to the synthesis of aluminosilicate and aluminophosphate molecular sieves, and more particularly to an improved hydrothermal synthesis process in which nitrogenous organic base is removed from the reaction mixture, preferably by distillation, as a means, inter alia, of increasing the yield of crystalline product or modifying the physical or chemical properties thereof, or both. In one embodiment of the invention the removal of the free organic base released into the aqueous reaction medium as a consequence of crystallization of the molecular sieve product is carried out while the crystals are still present in the reaction mixture and in such a manner as to shift the equilibrium between crystal formation and crystal dissolution in favor of decreased crystal dissolution. An improved product yield is thereby attained.

BACKGROUND OF THE INVENTION

The aluminosilicate, i.e., zeolitic, molecular sieves as a general class of crystalline materials have been synthesized commercially for many years. Whereas the earlier species were hydrothermally crystallized from reaction systems containing only inorganic reagents, there now exist a considerable number of species prepared from reaction mixtures which contain organic bases either as templating agents, templating agent precursors or constituents which increase the pH conditions favorable for zeolite crystallization. The zeolite species synthesized using organic bases tend to have a wider range of framework Si/Al ratios which in certain instances exceed a value of several thousand, i.e., are essentially silica polymorphs. The framework structures can also contain tetrahedral or octahedral oxides of numerous other metals or metaloids, such as gallium, germanium, boron, vanadium, titanium and the like.

The aluminophosphate molecular sieves comprise a considerable number of crystalline compositions formed from $PO_2^+$ and $AlO_2^-$ tetrahedral units only or in combination with $SiO_2$ tetrahedra and/or one or more other structural metal oxide units which can be tetrahedral or octahedral or both. In their simplest form the aluminophosphate molecular sieves consist of essentially equal numbers of $AlO_2^-$ and $PO_2^+$ tetrahedra and are, therefore, electrically neutral without the need for charge-balancing cations or anions. As such, these aluminophosphates do not exhibit ion-exchange properties, but nevertheless have been found to preferentially adsorb polar molecular species in a manner similar to the zeolitic aluminosilicate molecular sieves. When tetrahedral oxides of other elements such as silicon are incorporated into the structures, the aluminophosphates usually exhibit ion-exchange capacity and develop catalytically active acidic sites more characteristic of zeolites.

In the manner similar to the preparation of aluminosilicate molecular sieves, the aluminophosphate molecular sieves are synthesized by hydrothermal crystallization from aqueous reaction mixtures containing reactive precursors of $PO_2$, $AlO_2$ and any other metal oxide units which form the open structure of the aluminophosphate products. Although a few aluminophosphate species have been synthesized without the aid of nitrogenous organic bases, the conventional synthesis of these compositions involves the use of such bases as structure-directing materials. In addition to directing the crystallization by a templating mechanism, these nitrogenous compounds are usually strong organic bases which form complexes with the phosphorus-providing source, most commonly orthophosphoric acid, and thus are intimately involved in the chemistry of the synthesis reactions. It is sometimes the case that the nitrogenous base which actually directs the formation of the aluminophosphate product is employed in amounts only necessary for the templating function, with the requisite degree of adjustment to the reaction mixture pH being provided by supplemental, and often less expensive, organic bases.

For convenience of reference herein and for use in the attached claims, the term "molecular sieve" is intended to include the crystalline microporous aluminosilicates and aluminophosphates, but to exclude the so-called carbon molecular sieves or other non-crystalline compositions having a microporous character not determined by the location of atoms in a crystal lattice.

In the synthesis of the aforementioned molecular sieves, the templating agents are most commonly either amines or quaternary ammonium bases. The supplemental organic bases are most commonly amines. These compositions, if not relatively expensive, are usually toxic reagents. While a relatively small proportion of the templating agent exists at the end of the crystallization period as charge-balancing cations in the aluminophosphate product or simply as occluded material in the pore system of the product crystals, the bulk of the templating agent as well as the supplemental organic base in the starting reaction mixture remain in the mother liquor in one form or another. If unrecovered, these organic materials cause severe problems in the disposal of the mother liquor as waste due to its toxic nature. The high replacement costs of unrecovered organics are also a severe economic loss. It has now been discovered, moreover, that the manner and time of recovery of the organic bases can also have a marked effect upon the yield of the crystalline aluminophosphate product and the physical properties of that product.

BRIEF DESCRIPTION OF THE DRAWINGS

The sole figure of the drawings is a schematic flow diagram illustrating one embodiment of the process of the present invention.

SUMMARY OF THE INVENTION

In accordance with the present invention there is provided an improved process for the synthesis of molecular sieves. The prior known processes for synthesizing these crystalline microporous compositions comprise the steps of:

(a) forming an aqueous reaction mixture suitable for the hydrothermal production of a crystalline molecular sieve, said reaction mixture containing at least one nitrogen-containing organic templating agent and optionally a supplemental organic base;

(b) heating and maintaining said reaction mixture at a temperature of at least 100° C. in a reactor until crystals of the molecular sieve product are formed; and (c) recovering the molecular sieve crystals from the reaction mixture.

The improvement provided by the present invention comprises forming the reaction mixture of step (a) to contain organic base in excess of the amount to be incorporated within the product molecular sieve crystals, and thereafter removing at least some of said excess organic base prior to completion of step (c) whereby the equilibrium between product formation and product dissolution of the reaction system is shifted in favor of decreased dissolution of molecular sieve product at the existing temperature conditions. In a preferred embodiment of the process, excess organic base is removed from the reaction system at a temperature not substantially below the crystallization temperature, most preferably by distillation. In some instances it may be advantageous in the distillation procedure to utilize steam sparging which imparts both heat energy and water to the contents of the reactor. When distillation is employed as the means of removing the organic base, it is advantageous that the organic base have a vapor pressure of at least 10 mm. Hg at 25° C., preferably at least 25 mm. Hg at 25° C.

DETAILED DESCRIPTION OF THE INVENTION

As used herein and in the appended claims the term microporous crystalline aluminophosphate is intended to include both the compositions which contain only $AlO_2$ and $PO_2$ tetrahedral units and those other aluminophosphate compositions in which some of the $PO_2$ and/or $AlO_2$ units are substituted in the crystal structure by oxide units of other elements such as silicon and the common metals. The aluminophosphates which contain only $AlO_2$ and $PO_2$ units are exemplified by the compositions described in U.S. Pat. No. 4,310,440, issued Jan. 12, 1982, to S. T. Wilson et al. Typically, these materials have a chemical composition, expressed in terms of molar ratios of oxides as

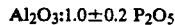
$Al_2O_3:1.0\pm0.2\ P_2O_5$

The various species which make up this general class of compounds are most commonly denominated as AlPO4-n wherein "n" represents one or more digits such as 5, 11, 31, 41, etc., which serve to identify the particular crystal structure of the species. In some instances, however, the "AlPO4" is substituted by other letters such as "VPI" or "MCM" which refer to the proprietor or inventive entity of the aluminophosphate, e.g., VPI-5 and MCM-9.

When $SiO_2$ tetrahedra are included in the crystal structure in addition to $AlO_2$ and $PO_2$ units, the compositions are generally referred to as SAPO's, an acronym for silicoaluminophosphate. Species of this class of aluminophosphates are commonly identified by the term SAPO-n in which "n" represents a particular crystalline structure such as SAPO-5, SAPO-11, SAPO-54, etc. In those cases in which the crystal structure is the same or topologically related to an AlPO4-n material, the "n" is usually the same number in the SAPO composition as in the parent AlPO4 material. This general rule of nomenclature is not strictly adhered to, however. Typical SAPO compositions are disclosed in U.S. Pat. No. 4,440,871, issued Apr. 3, 1984, to B. M. Lok et al.

A very large number of other aluminophosphate molecular sieves containing one or more other metal or metal-like framework constituents are presently known and new species continue to be reported. Crystalline metal aluminophosphates, known as MeAPO's where "Me" is at least one of Mg, Mn, Zn and Co, are disclosed in U.S. Pat. No. 4,567,029, issued Jan. 28, 1986, to S. T. Wilson et al. Crystalline ferroaluminophosphates, known as FAPO's, are disclosed in U.S. Pat. No. 4,554,143, issued Nov. 19, 1985. Titanium aluminophosphates (TAPO's) are disclosed in U.S. Pat. No. 4,500,651, issued Feb. 19, 1985. Still other species, known as ELAPO's or ELAPSO's, wherein "EL" represents one or more chemical elements which in tetrahedral oxide structures have "T-O" bond distances of from about 1.51 Angstroms to 2.06 Angstroms and a cation electronegativity of between about 125 and 310 kcal/g-atom. ELAPO's are disclosed in published EPC application No. 0158976 (published Oct. 13, 1985) and ELAPSO's are disclosed in published EPC application No. 85 104 387.7, Publication No. 0159624 (published Oct. 30, 1985).

The methods of preparation of the various crystalline aluminophosphate compositions are also described in, among numerous other published documents, the patents and published applications referred to above. In general an aqueous reaction mixture is formed comprising a nitrogen-containing organic base as a templating agent, a reactive source of alumina such as aluminum isopropoxide or a hydrated pseudoboehmite, orthophosphoric acid, a reactive source of each of the other elements to be included within the lattice structure of the product aluminophosphate and optionally a supplemental organic base to modify the pH of the reaction mixture. The silicon-containing reagent is most commonly a silica sol, but precipitated and fumed silica are also widely used. Cobalt, magnesium, zinc, manganese and iron are advantageously imparted to the reaction mixture in the form of acetates or sulfates. Titanium isopropoxide is a convenient reagent in the case of titanium. A comprehensive description of the reagents and the synthesis procedures is disclosed in EPC published application U.S. Pat. No. 0,249,914 (published May 15, 1991). In some instances the crystallization temperature can be as low as 50° C. and as high as 250° C., but in general a temperature in the range of 100° C. to 200° C. is employed. The pressure conditions are dependent upon the temperature employed since the crystallization occurs in a sealed reactor over periods as short as several minutes up to as long as several days.

Similarly, the term microporous crystalline aluminosilicate is intended to include both the compositions which contain only $AlO_2$ and $SiO_2$ tetrahedral units and those which contain in addition other units such as the tetrahedral oxides of gallium, germanium, vanadium and titanium. While a large percentage of the more recently synthesized aluminosilicates have been prepared from reaction mixtures containing organic bases, these organic bases are most frequently quaternary ammonium compounds having a relatively low volatility. There are, however, a significant number of syntheses in which other organic bases, particularly amines, are employed as in situ precursors of quaternary ammonium compounds or as templating agents in combination with alkali metal hydroxides. Many review papers on zeolite synthesis have been published in the literature, including that by Lok et al in ZEOLITES, 1983, Vol. 3, pgs. 282-291, which deals specifically with the role of organic molecules in molecular sieve synthesis. The Lok et al publication, as well as the reference publications cited therein, are incorporated herein by reference.

The particular organic templating agent and supplemental organic base employed in the process of the present invention are not critical factors. Without wishing to be bound by any particular theory, it is believed that the organic base is involved in the formation of the "gel" created when the reaction mixture ingredients are initially combined, and remains complexed until the gel is converted to crystalline molecular sieve products, most likely via the formation of an intermediate solution species. The conversion of a phosphatoaluminate gel to crystalline products can be illustrated by the following reversible equation in which di-n-propylamine (n-Pr$_2$NH) is representative of the general class of organic bases:

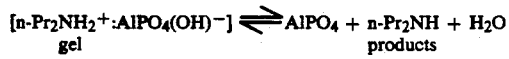

The gel and the products ultimately reach an equilibrium which terminates the formation of additional crystalline AlPO$_4$. The extent to which the reaction proceeds to the right in the equation depends upon the solubility of the crystalline AlPO$_4$ in the amine-water mixture at the crystallization temperature. By similar chemistry an aluminosilicate hydrogel is converted to a crystalline zeolite. By removing the amine from the system, the equilibrium at the crystallization temperature is shifted to the right, resulting in an increased yield of the desired crystalline product. Accordingly, it is the capability of the excess nitrogenous organic bases to form aluminosilicate or phosphatoaluminate complexes, a property common to the general class, which is important in the present process. It is preferred that at least some of the excess nitrogenous organic base be sufficiently volatile to be vaporized and distilled from the reaction mixture mother liquor at the appropriate time in the crystallization phase of the process and at a temperature at least as high as the reaction mixture temperature employed during the crystallization period and not greater than the maximum crystallization temperature suitable for the crystallization of the particular molecular sieve involved. By the term "excess nitrogenous organic base" as used herein is meant organic base not chemically bonded to or occluded within the pore system of the crystalline aluminosilicate or aluminophosphate product.

The quaternary ammonium compounds are represented generally by the formula R$_4$N$^+$ wherein each R is an alkyl or aryl group containing from 1 to 8 carbon atoms. Polymeric quaternary ammonium salts such as [(C$_{14}$H$_{32}$N$_2$)(OH)$_2$]$_x$ wherein "x" has a value of at least 2 are also suitably employed. Each of mono-, di- and tri-amines is advantageously utilized, either alone or in combination with a quaternary ammonium compound or other templating compound. Mixtures of two or more organic bases can be employed. Specific templating agents typical of those suitably employed in the present process include tetramethylammonium, tetraethylammonium, tetrapropylammonium or tetrabutylammonium ions; di-n-propylamine; tripropylamine; triethylamine; ethylbutylamine; di-isopropylamine; diethanolamine; diethylethanolamine; triethanolamine; piperidine; cyclohexylamine; 2-methylpyridine; N,N-dimethylbenzylamine; N,N'-dimethylethanolamine; choline; N,N-dimethylpiperazine; 1,4-diazabicyclo(2,2,2)octane; N-methyldiethanolamine; N-methylethanolamine; N-methylpiperidine; 3-methylpiperidine; N-methylcyclohexylamine; 3-methylpyridine; 4-methylpyridine; quinuclidine; N,N'-dimethyl-1,4-diazabicyclo(2,2,2)octane ion; di-n-butylamine; neopentylamine; di-n-pentylamine; iso-propylamine; t-butylamine; ethylenediamine; pyrolidine; and 2-imidazolidone.

In carrying out the present process, the reaction mixtures suitable for the production of a desired aluminosilicate or aluminophosphate are prepared in the conventional manner and digested in the conventional manner, either under autogenous pressure at an appropriate temperature, or at a higher or lower pressure which permits the controlled release of organic base and water vapor from the reactor headspace. It has been observed, however, that in many instances the undesirable thickening of the reaction mixture during heating to reach the digestion-crystallization temperature can be ameliorated by the addition of more than the necessary minimum amount of the organic templating agent. Heretofore it has not been economically feasible to take full advantage of this phenomenon since the costs of unrecovered templating agent were prohibitive and the costs of waste disposal significantly increased. By means of the present process, however, the ready recovery of the unused templating agent at any time after the formation of the reaction mixture and prior to the end of the crystallization period removes these constraints against the initial use of higher than necessary amounts of templating agent. Accordingly, in those cases in which the templating agent decreases the viscosity of the reaction mixture, it is a preferred mode of operation to incorporate more than the necessary amount into the initial reaction mixture and to recover the excess as a part of the normal operation of the present process. It will be understood by those skilled in the art that variations in the proportion of organic base in the reaction system can affect the nucleation process and hence may prevent crystallization or, if crystallization occurs, the crystal structure of the molecular sieve phase formed. Accordingly, in those instances in which crystallization is inhibited or the crystalline product is not the one desired, removal of excess organic base prior to the beginning of the crystallization step will be required.

Since the reaction mixture contains both water and organic constituents and is maintained at elevated temperatures for appreciable periods of time, the digestion-crystallization phases of the process are ordinarily carried out in a sealed reactor. The autogenous pressure developed in the sealed reactor is, however, incidental to preventing the undue loss of reactants and not an essential feature of the synthesis process. Accordingly, it is essential only that the pressure in the reactor be such that the removal of excess organic base be under controlled conditions which do not disrupt the crystallization process. In general such disruption would result only if too great a quantity of water were removed from the reaction mixture for too long a time over the relatively lengthy crystallization period. Thus, an internal reactor pressure equal to or higher than that autogenously generated within the reactor, if sealed, can be maintained by inserting water vapor or an inert gas such as nitrogen into the reactor to compensate for the release of organic base and water vapor from the reactor head space. Fluctuations in the reactor pressure caused by controlled intermittent removal of organic base and water vapor are not harmful to the crystallization reaction.

The method of removal of organic base from the reaction system is not a critical factor. While various mechanical means will be obvious to those of routine skill in the art, a preferred technique is distillation, optionally with steam sparging, an option which provides a means of adding heat energy and water to the reaction mixture coincidentally with the removal of water and heat energy from the reaction system along with the organic base. Such a preferred procedure is illustrated hereinafter in the working examples. While the optimum reaction temperature can vary dependent upon the particular aluminophosphate species being synthesized, in general temperature in the reactor is between about 150° C. and 200° C.

The removal of organic base from the reaction system can be carried out essentially at any time after the formation of the reaction mixture up to the time the crystalline product is recovered, provided that such removal results in a shift of the equilibrium between product formation and product dissolution toward greater product formation or toward lesser product dissolution. In this regard there are two separate aspects of the process of this invention, both of which can be present in any given synthesis or either utilized alone. Where the principal benefit to be gained is increased production of a particular molecular sieve or where excess amounts of organic base have been added to the reaction mixture to modify its rheological properties, the removal of organic base can be commenced as soon as the reaction mixture has been brought to its normal reaction temperature. The removal of organic base can be continuous or intermittent, and can be delayed until the reaction system reaches its initial equilibrium state between formation and dissolution of the crystalline product. The equilibrium is temperature dependent, however, with lower temperatures favoring the dissolution of product crystals. Lowering the temperature also decreases the rate of reaction and hence the rate at which the less favorable equilibrium state is achieved. From the standpoint of product yield, therefore, it is important not to delay removal of the product crystal from the cooling reactor at the end of the crystallization period unless the temperature has been significantly decreased. On the other hand, it has been observed in some instances that the partial dissolution of product crystals during cool-down at the normal end of the crystallization period can be beneficial. If the crystals do not dissolve uniformly, a pitted surface or a hollow crystal interior can result, which can produce a significant change in the adsorptive capacity and/or catalytic activity of the product crystals. Thus the removal of organic base prior to completion of this cool-down period serves as a means of controlling the rate of crystal dissolution and hence to some extent the physical properties of the product ultimately recovered. In those instances in which the organic base to be removed is less soluble in the reaction system at a temperature higher than the crystallization temperature, it may be advantageous to increase the temperature of the reaction system immediately prior to the removal procedure when distillation is the removal mode selected.

It will be understood that the removal of organic base from the reaction mixture as a means of decreasing the dissolution of crystalline molecular sieve product can be augmented by other techniques, particularly when such techniques are applied immediately prior to recovery of the crystal product. For example, rapidly decreasing the concentration of organic base of the reaction mixture by the addition of relatively large amounts of water can be beneficial. Also a rapid and significant decrease of the temperature of the reaction system, i.e., quenching, will, as mentioned hereinabove, retard the rate of crystal dissolution. These two devices can be combined by using chilled water as the diluent.

For use in the commercial scale preparations of crystalline molecular sieves, the use of distillation techniques are highly preferred in the practice of the present process and are adaptable to essentially any scale of production. As used herein, the term distillation as applied to the removal of the templating agent from the post-crystallization reactor contents is not used in any narrow technical sense, but rather refers to the vaporization and withdrawal of templating agent present in the reactor either as a distinct liquid phase or in solution in the mother liquor. It is believed to be advantageous to utilize steam sparging of the reactor contents as the means for imparting the heat energy necessary for the distillation process. To facilitate recovery of the organic base it is preferred to obtain a distillate from the reactor which contains a maximum of the organic base and a minimum of water or other volatile ingredients of the reaction mixture. On the other hand, the removal of significant portions of the reaction system water can facilitate the recovery of the crystalline product. Optimization of the distillation procedure will depend upon the particular templating agent involved and its concentration in the mother liquor. These matters are routinely determined, however, by those skilled in the art.

Following removal of the desired amount of templating agent from the reactor, the molecular sieve product is recovered and purified of occluded liquid and/or solids in the conventional manner. It is found that the present process provides yet another advantage when the product crystals are recovered by filtration. By removing the templating agent and preventing its reaction with molecular sieve product, the remaining liquid phase contains a smaller content of dissolved solids and is accordingly less viscous. The filtration procedure is thus more readily accomplished.

The process of the invention is illustrated by the following examples:

EXAMPLE 1

The synthesis of the magnesium silicoalumino-phosphate known as MAPSO-31 was carried out as follows: A reaction mixture having a composition in terms of molar oxide ratios of

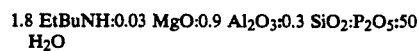

was prepared by adding 6.6 grams of magnesium acetate tetrahydrate to a solution of 236.3 grams of 85% aqueous orthophosphoric acid in 760.5 grams of distilled water. Thereafter 120.6 grams of $Al_2O_3$ (Versal 250) were added to and blended with the first-formed mixture over the period of about 10 minutes, followed by the addition of 62.6 grams of an aqueous silica sol (30 wt. % $SiO_2$) and 186.6 grams of ethylbutylamine (EtBuNH), the latter addition accomplished with blending over the period of about 10 minutes. The mixture became appreciably thicker after addition of about half of the amine reagent, but became thinner with subsequent addition of the remainder of the amine. Finally, 27.3 grams of seed crystals of $AlPO_4$-31 were added and the resultant homogenous gel was sealed in a stainless steel reactor equipped with stirring means, external heating means and a take-off valve and conduit connecting the reactor headspace to a water-cooled condenser. Over the period of about 2 hours the temperature of the reaction mixture was raised from its initial temperature of 54° C. up to a crystallization temperature of 195° C. Upon reaching the crystallization temperature, the take-off valve was partially opened to permit the flow of water vapor and ethylbutylamine from the reactor head space through the conduit to the condenser while maintaining the pressure inside the reactor at about 195 to 200 psi. After a period of about one hour the most of the amine had been removed from the reactor. Heating of the reactor was terminated and the distillation continued for about 60 minutes until a total of about 200 ml. of distillate had been recovered from the condenser. At that point 1000 ml. of water at 0° C. was pumped into the reactor under a pressure of 250 psi which rapidly lowered the reactor temperature to 83° C. The reactor and contents were then quenched to a temperature of 45° C. by immersion in ice. Upon opening the reactor, no amine phase was evident. The pH of the reactor contents was 4.75. The solids were removed by centrifugation, washed with water and dried at 100° C. in air overnight. By x-ray analysis the product was found to be pure MAPSO-31.

EXAMPLE 2

The synthesis of SAPO-11 using the distillation enhanced crystallization method of the present invention was accomplished by the following procedure: Using an order of mixing which corresponds to that described in Example 1, above, 820.4 grams of water, 218.9 grams of 85% aqueous orthophosphoric acid solution, 150.8 grams of $Al_2O_3$ (Versal 250), 14.9 grams $SiO_2$ (HiSil), 192.1 grams of dipropylamine ($Pr_2NH$), and 2.9 grams of SAPO-11 seed crystals were combined to form a reaction mixture, exclusive of the SAPO-11 seed crystals, having the following composition in terms of mole ratios:

1.8 $Pr_2NH$:0.9 $P_2O_5$:$Al_2O_3$:0.2 $SiO_2$:50 $H_2O$

The resulting gel, having an initial pH of 5.35, was sealed in a stirred reactor of the type used in Example 1 and heated from an initial temperature of 41° C. to 195° C. over the period of 6 hours, and held at that temperature for 12 hours. Thereafter the distillation of dipropylamine and water vapor from the reactor head space was begun while maintaining a pressure of about 200 psi in the reactor and the temperature of the reaction mixture at 195° C. After 203 ml. of dipropylamine and 72 ml. of water had been collected as the distillate, heating was discontinued and the reactor and its contents allowed to cool to ambient room temperature overnight. The final pH of the reaction mixture was 5.8. The product crystals were recovered by centrifugation, washed with water and dried in air at 100° C. for 2 days. X-ray analysis confirmed that the product was SAPO-11 with only a trace of SAPO-31 being present. Based on the weight of the starting gel, the yield of crystalline product was 18%. By conventional techniques, the corresponding SAPO-11 yield is normally about 9%.

EXAMPLE 3

With reference to the schematic flow diagram of the drawings, the process of Example 2 can be carried out with steam sparging of the reaction system as a means of facilitating the distillation of the organic base. The reaction mixture prepared in Example 2 is placed in reactor 10. The reactor is equipped with stirring means 12 and means to raise the temperature of the reaction mixture to the crystallization temperature of 195° C. The heating means can be internal or external, and is represented in the drawing by internal heater 14. Reactor 10 is also provided with line 16 through which nitrogen, under a pressure substantially the same as the autogenous pressure which would develop in the sealed reactor at crystallization temperature, can be introduced into the reactor. After crystals of the SAPO-11 aluminophosphate product have begun to form in the reactor, the removal of excess di-n-propylamine from the reactor head space is begun by introducing steam at a temperature in excess of 195° C. through line 18 into reactor 10 and permitting the passage of amine and water vapor from the reactor through line 20, pressure controlled release valve 22 and line 24 to condenser 26 wherein both the water vapor and the amine vapor are condensed to the liquid state and passed through line 28 to separation means 30. The amine and water are only slightly miscible at the temperature existing in the separator, thus permitting the amine layer to be removed through line 32 and the water layer to be either removed from the system through line 36 or returned to the reactor through line 38, or portions thereof treated in each of the two ways. If required, the initial pressure in the reactor can be maintained during the steam-sparged distillation operation by adding nitrogen through line 16. The continuous removal of amine from the reactor shifts the equilibrium of the reaction system in favor of additional SAPO-11 production, and when the excess amine has been substantially all removed, the reactor can be permitted to cool to ambient room temperature or quenched by the introduction of chilled water. The SAPO-11 crystals are recovered in the conventional manner.

What is claimed is:

1. In the process for synthesizing a crystalline microporous molecular sieve which comprises the steps of:
    (a) forming in a reactor an aqueous reaction mixture suitable for the hydrothermal production of a crystalline molecular sieve, said reaction mixture containing at least one nitrogen-containing organic templating agent and optionally a supplemental organic base;
    (b) establishing a crystallization period by heating and maintaining said reaction mixture at a crystallization temperature of at least 100° C. to from crystals of the molecular sieve product and establish an equilibrium between molecular sieve crystal formation and molecular sieve dissolution; and
    (c) recovering the crystallized product from the reaction mixture;
    the improvement which comprises forming the reaction mixture of step (a) to contain organic base in excess of the amount to be incorporated within the product molecular sieve crystals, and thereafter removing at least some of said excess organic base during the course of the crystallization period of step (b) whereby the said equilibrium between product formation and product dissolution of the reaction system is shifted in favor of decreased dissolution of molecular sieve product at the existing temperature conditions.

2. Process according to claim 1 wherein in step (a) at least one nitrogen-containing organic base incorporated into the aqueous reaction mixture has a vapor pressure at 25° C. of at least 10 mm. Hg.

3. Process according to claim 2 wherein the nitrogenous organic base is removed by distillation.

4. Process according to claim 3 wherein the distillation from the reactor contents is facilitated by steam sparging.

5. Process according to claim 1 wherein in forming the aqueous reaction mixture of step (a) the viscosity thereof is decreased by the incorporation of an amount of organic templating agent in excess of the amount necessary for the crystallization mechanism.

6. Process according to claim 3 wherein the nitrogen-containing organic base comprises at least one amine.

7. Process according to claim 1 wherein the excess nitrogen-containing organic base removed from the reaction system is removed while the reaction mixture is substantially at the crystallization temperature.

* * * * *